United States Patent
Ichiba

(10) Patent No.: US 11,474,946 B2
(45) Date of Patent: Oct. 18, 2022

(54) CALCULATOR AND CALCULATION METHOD

(71) Applicant: FUJITSU LIMITED, Kawasaki (JP)

(72) Inventor: Toshiyuki Ichiba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/505,069

(22) Filed: Oct. 19, 2021

(65) Prior Publication Data
US 2022/0197810 A1    Jun. 23, 2022

(30) Foreign Application Priority Data

Dec. 21, 2020 (JP) .............................. JP2020-211064

(51) Int. Cl.
| | |
|---|---|
| G06F 12/00 | (2006.01) |
| G06F 12/0862 | (2016.01) |
| G06F 12/0811 | (2016.01) |
| G06F 1/08 | (2006.01) |
| G06F 9/30 | (2018.01) |
| G06F 12/02 | (2006.01) |

(52) U.S. Cl.
CPC ............ G06F 12/0862 (2013.01); G06F 1/08 (2013.01); G06F 9/3001 (2013.01); G06F 12/0238 (2013.01); G06F 12/0811 (2013.01); G06F 2212/1021 (2013.01)

(58) Field of Classification Search
CPC ............ G06F 12/0862; G06F 12/0238; G06F 12/0811; G06F 1/08; G06F 9/3001; G06F 2212/1021
See application file for complete search history.

(56) References Cited

U.S. PATENT DOCUMENTS

| 11,379,372 B1 * | 7/2022 | Mukherjee .......... G06F 12/0811 |
| 2015/0089149 A1 | 3/2015 | Kimura |

FOREIGN PATENT DOCUMENTS

| JP | 2009-540429 A | 11/2009 |
| JP | 2015-060529 A | 3/2015 |
| WO | 2007/145700 A1 | 12/2007 |

* cited by examiner

Primary Examiner — Shawn X Gu
(74) Attorney, Agent, or Firm — Fujitsu Patent Center

(57) ABSTRACT

A calculator includes a processing core and a cache. The cache includes a data memory that holds data transferred from a main memory and a cache controller that controls transfer of data between the main memory and the data memory. The cache controller is configured to calculate, upon occurrence of a cache miss, a cycle count requested for arithmetic processing on one unit amount of data based on a cache miss occurrence interval and a memory access latency requested, and update a prefetch distance based on the calculated cycle count and the memory access latency, the prefetch distance indicating a relative distance on the main memory between a location from which the one unit amount of data transferred from the main memory due to the cache miss and a location from which a next one unit amount of data is to be prefetched.

9 Claims, 13 Drawing Sheets

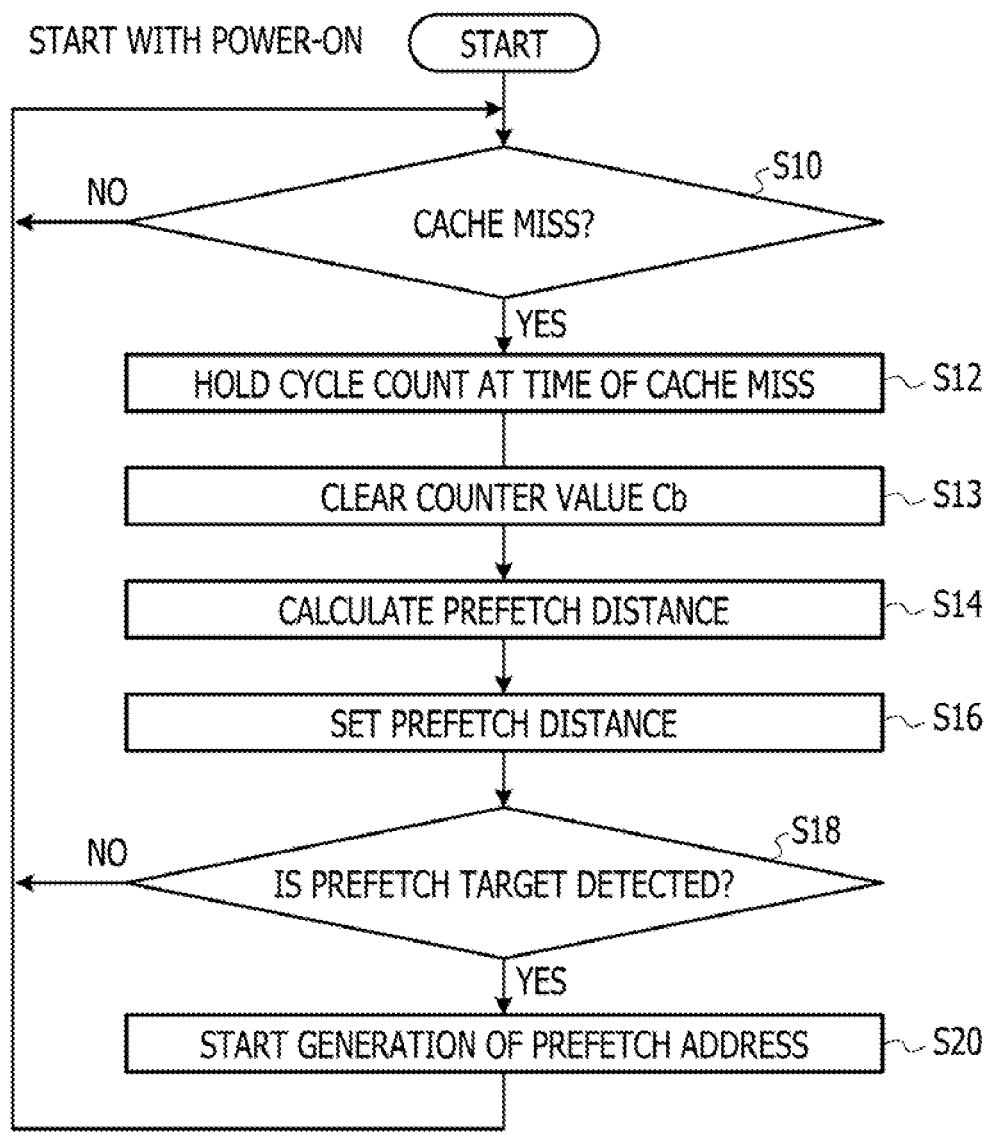

CALCULATOR AND CALCULATION METHOD

CROSS-REFERENCE TO RELATED APPLICATION

This application is based upon and claims the benefit of priority of the prior Japanese Patent Application No. 2020-211064, filed on Dec. 21, 2020, the entire contents of which are incorporated herein by reference.

FIELD

The embodiments discussed herein are related to a calculator and a calculation method.

BACKGROUND

In a processor such as a central processing unit (CPU), a memory access latency, which is an access time for a main memory, is often longer than a running time for an operation. For this reason, in a calculator equipped with a processor, a cache for holding data or instructions used with high frequency is provided between a processor core and a main memory, thereby improving data transfer efficiency. Use of multi-level memories enhances the execution efficiency of operations regardless of the memory access latency, and thus improves the performance of the processor and the calculator.

In order to further improve the execution efficiency of operations, there is known a processor having a prefetch function in which, before execution of an operation instruction, data or an instruction to be used for the operation is transferred from a main memory to a cache in advance. For example, this type of processor holds location information of an instruction that caused a cache miss in the past, and issues a prefetch request when the location information of an instruction causing a current cache miss is included in the location information of the instruction that caused the cache miss in the past.

In this type of processor, the number of cache misses at successive addresses is set in advance by a number-of-cache-misses specifying instruction. When the set number of cache misses occur, the processor prefetches a cache line subsequent to the cache-missed cache line. The location of a cache line to be prefetched may be set in advance by a location specifying instruction.

Japanese National Publication of International Patent Application No. 2009-540429 and Japanese Laid-open Patent Publication No. 2015-60529 are disclosed as related art.

The number-of-cache-misses specifying instruction and the location specifying instruction are written in the source program, and are not allowed to be changed during execution of the source program. The location of the cache line changed by a location change instruction is also referred to as a prefetch distance.

For example, when the source program includes a plurality of loop processes different from each other in arithmetic processing time, the optimal prefetch distance may differ for each loop process. However, it is possible to set the prefetch distance suited to any one of the plurality of loop processes. For this reason, a prefetch distance set suited to a certain loop process may not be suited to another loop process. In this case, the program execution efficiency decreases.

In one aspect, it is an object of the present disclosure to set an optimal prefetch distance depending on a running time that is different in each type of arithmetic processing.

SUMMARY

According to an aspect of the embodiments, a calculator includes a processing core that executes arithmetic processing and a cache including a data memory that holds data transferred from a main memory and a cache controller that controls transfer of data between the main memory and the data memory, wherein the cache controller is configured to calculate, upon occurrence of a cache miss, a cycle count requested for arithmetic processing on one unit amount of data based on a cache miss occurrence interval and a memory access latency requested to transfer the one unit amount of data from the main memory to the data memory unit, and update a prefetch distance based on the calculated cycle count and the memory access latency, the prefetch distance indicating a relative distance on the main memory between a location from which the one unit amount of data transferred from the main memory due to the cache miss and a location from which a next one unit amount of data is to be prefetched.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a flowchart illustrating an example of an operation of the prefetcher in FIG. 11.

DESCRIPTION OF EMBODIMENTS

Figure 1:
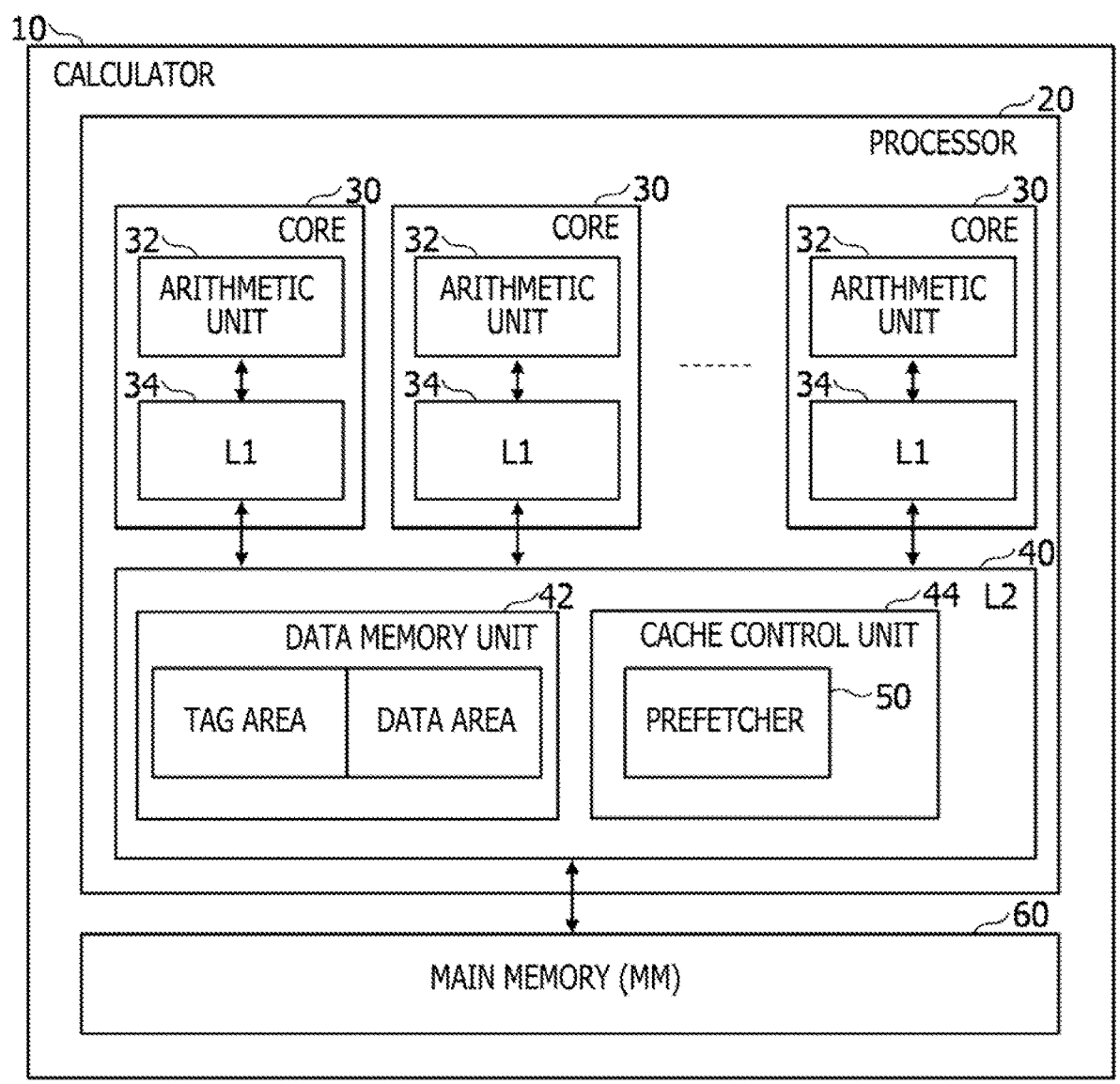
FIG. 1 is a block diagram illustrating an example of a calculator in an embodiment.

Hereinafter, the embodiments will be described with reference to the drawings. A signal line for transmitting information such as a signal will be denoted below by the same sign as the signal name. A signal line depicted by a single line in the drawings may include a plurality of bits.

FIG. 1 illustrates an example of a calculator according to an embodiment. A calculator 10 illustrated in FIG. 1 is, for example, a server, a personal computer (PC), or a supercomputer. The calculator 10 includes a processor 20 and a main memory 60. The calculator 10 may include a plurality of processors 20. The processor 20 includes a plurality of processing cores 30 each including an arithmetic unit 32 and an L1 cache 34, and an L2 cache 40.

The arithmetic unit 32 includes a plurality of arithmetic elements (not illustrated), and executes instructions written in a program by using data held in the L1 cache 34. The arithmetic unit 32 is an example of a processing unit that executes arithmetic processing. The L1 cache 34 may hold not only data but also instructions. The following description will be given on the assumption that the L1 cache 34 and the L2 cache 40 hold data.

As illustrated in FIG. 1, the calculator 10 has a multi-level memory structure. Data to be used with relatively high frequency is transferred from the main memory 60 to the L2 cache 40, and data to be used with even higher frequency is transferred from the L2 cache 40 to the L1 cache 34. In a case where each of the L1 cache 34 and the L2 cache 40 runs short of a storage area for holding data transferred from a lower level, the data that is already held is purged to the lower level.

The access speed by the arithmetic unit 32 is higher in the order of the L1 cache 34, the L2 cache 40, and the main memory 60. Therefore, transfer of data to be used with high frequency from the main memory 60 to the L1 cache 34 or the L2 cache 40 in advance makes it possible to shorten a time until the arithmetic unit 32 executes an instruction after decoding the instruction. As a result, the processing performance of the calculator 10 may be improved.

The L2 cache 40 includes a data memory unit 42 that holds data transferred from the main memory 60, and a cache control unit 44 that controls data transfer between the main memory 60 and the data memory unit 42. For example, the data memory unit 42 has a tag area for holding a cache status and a most-significant bit group of an address, and a data area for holding data. The cache control unit 44 includes a prefetcher 50.

The prefetcher 50 predicts an address in the main memory 60 at which data to be used for an operation by the arithmetic unit 32 is stored. The L2 cache 40 outputs the address predicted by the prefetcher 50 to the main memory 60 as a prefetch address, and transfers data from the main memory 60 to the L2 cache 40 in advance. In this case, the prefetcher 50 predicts a prefetch address so as to reduce the number of cache misses. As described above, the processor 20 has a hardware prefetch function.

Figure 2:
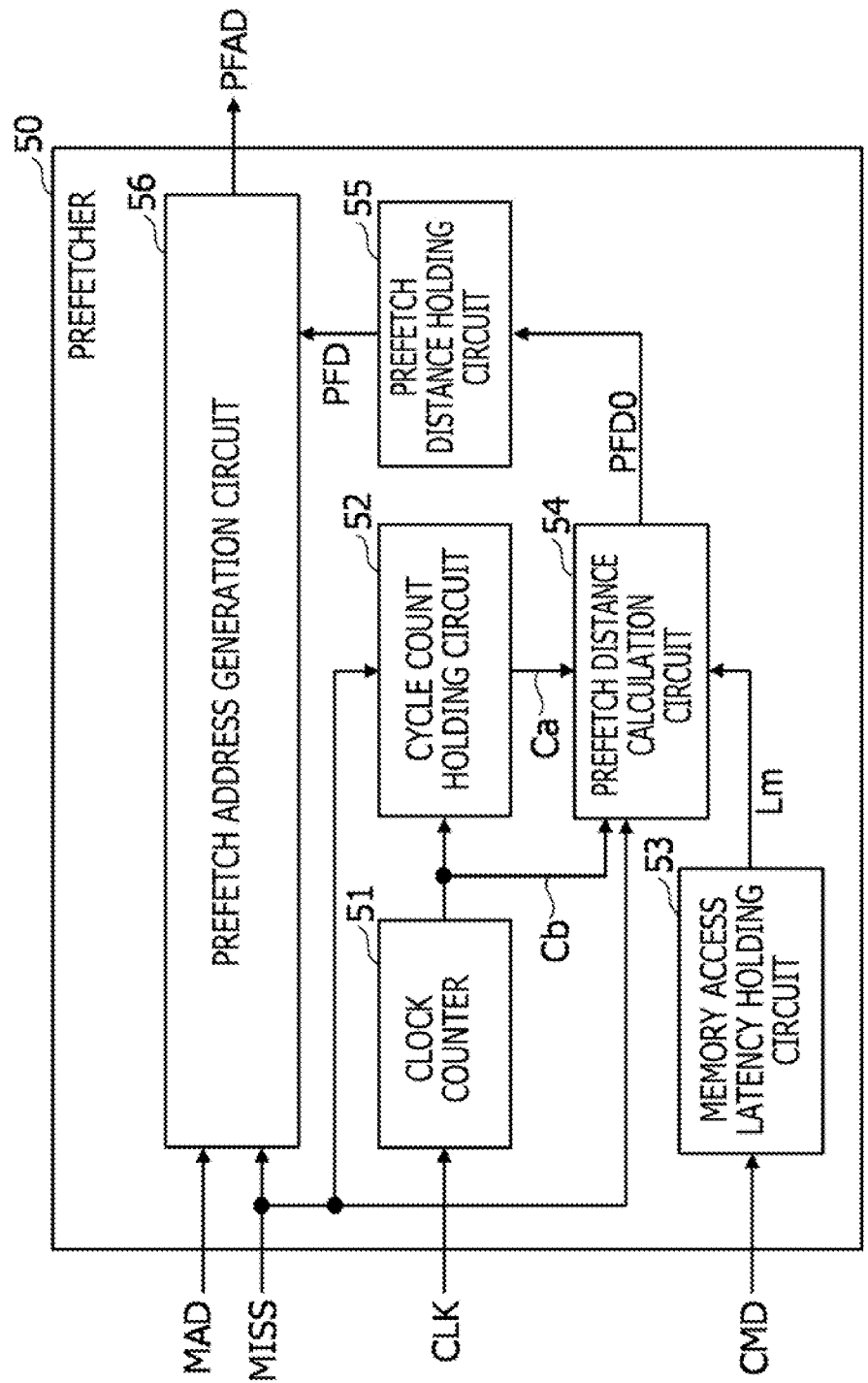
FIG. 2 is a block diagram illustrating an example of a prefetcher in FIG. 1.

FIG. 2 illustrates an example of the prefetcher 50 in FIG. 1. The prefetcher 50 includes a clock counter 51, a cycle count holding circuit 52, a memory access latency holding circuit 53, a prefetch distance calculation circuit 54, a prefetch distance holding circuit 55, and a prefetch address generation circuit 56.

The clock counter 51 makes a clock count of a clock CLK and outputs the clock count thus obtained as a counter value Cb. For example, the clock counter 51 operates all the time regardless of whether or not the prefetcher 50 outputs a prefetch address PFAD. The clock CLK may be an operation clock of the core 30 or a divided clock obtained by dividing the frequency of the operation clock.

In synchronization with a cache miss signal MISS indicating the occurrence of a cache miss, the cycle count holding circuit 52 holds the counter value Cb and outputs the counter value Cb as a counter value Ca. The cycle count holding circuit 52 updates the counter value Ca every time a cache miss signal MISS is received.

A clock cycle count expressed by a difference Cb−Ca between the counter value Cb output from the clock counter 51 at the occurrence of a cache miss and the counter value Ca held in the cycle count holding circuit 52 at the occurrence of the cache miss indicates a cache miss occurrence interval.

The memory access latency holding circuit 53 holds a memory access latency Lm included in a command CMD supplied from the outside of the calculator 10 before the arithmetic unit 32 starts the arithmetic processing, and outputs the held memory access latency Lm. The memory access latency Lm is a length of time (clock cycle count) requested by the core 30 to acquire, from the main memory 60, a predetermined amount of data to be used for one loop process to be described later. The predetermined amount of data to be used in one loop process is an example of one unit amount of data.

In response to reception of a cache miss signal MISS, the prefetch distance calculation circuit 54 calculates a prefetch distance PFD0 based on the memory access latency Lm for one unit amount and the counter values Cb and Ca, and outputs the calculated prefetch distance PFD0. For example, the prefetch distance calculation circuit 54 calculates the prefetch distance PFD0 by using Expression (1).

$$PFD0 = CEIL(Lm/(Cb-Ca-Lm)) \quad (1)$$

In Expression (1), a sign CEIL denotes a ceiling function that gives the smallest integer equal to or larger than the value of the calculation result in the parentheses.

"Cb−Ca" denotes an interval between cache misses that occur consecutively, and is equal to the sum of the memory access latency Lm for one unit amount and a processing cycle count that is a length of time requested to execute the arithmetic processing for one unit amount. Thus, the processing cycle count for one unit amount is obtained by subtracting the memory access latency Lm from "Cb−Ca". By calculating the ceiling function of a value obtained by dividing the memory access latency Lm by the processing cycle count, it is possible to calculate the prefetch distance PFD0 indicating a value corresponding to how many times the processing cycle count for one unit amount is the memory access latency Lm.

The prefetch distance holding circuit 55 holds the prefetch distance PFD0 output by the prefetch distance calculation circuit 54 and outputs the held prefetch distance as a prefetch distance PFD. The prefetch address generation circuit 56 repeatedly receives a memory address to be used for a read access to the main memory 60 and detects a tendency of a memory address change or the like (for example, such as an increase or decrease in the memory address by a predetermined amount). The prefetch address generation circuit 56 detects the start of the loop process of a prefetch target based on the memory address change tendency or the like, and predicts and registers a prefetch candidate based on the change tendency. For example, the prefetch candidate predicted may be a memory address or a range of memory addresses.

The prefetch address generation circuit 56 determines whether the memory address at the occurrence of a cache miss matches the prefetch candidate predicted in advance. When the memory address matches the prefetch candidate, the prefetch address generation circuit 56 determines that the prefetch distance PFD held in the prefetch distance holding circuit 55 is valid. The prefetch address generation circuit 56 generates a prefetch address PFAD based on the valid prefetch distance PFD.

When the prefetcher 50 generates the prefetch address PFAD, the L2 cache 40 illustrated in FIG. 1 uses the prefetch address PFAD to perform a read access to the main memory 60 and read data from the main memory 60. For example, the L2 cache 40 prefetches the data.

Figure 3:
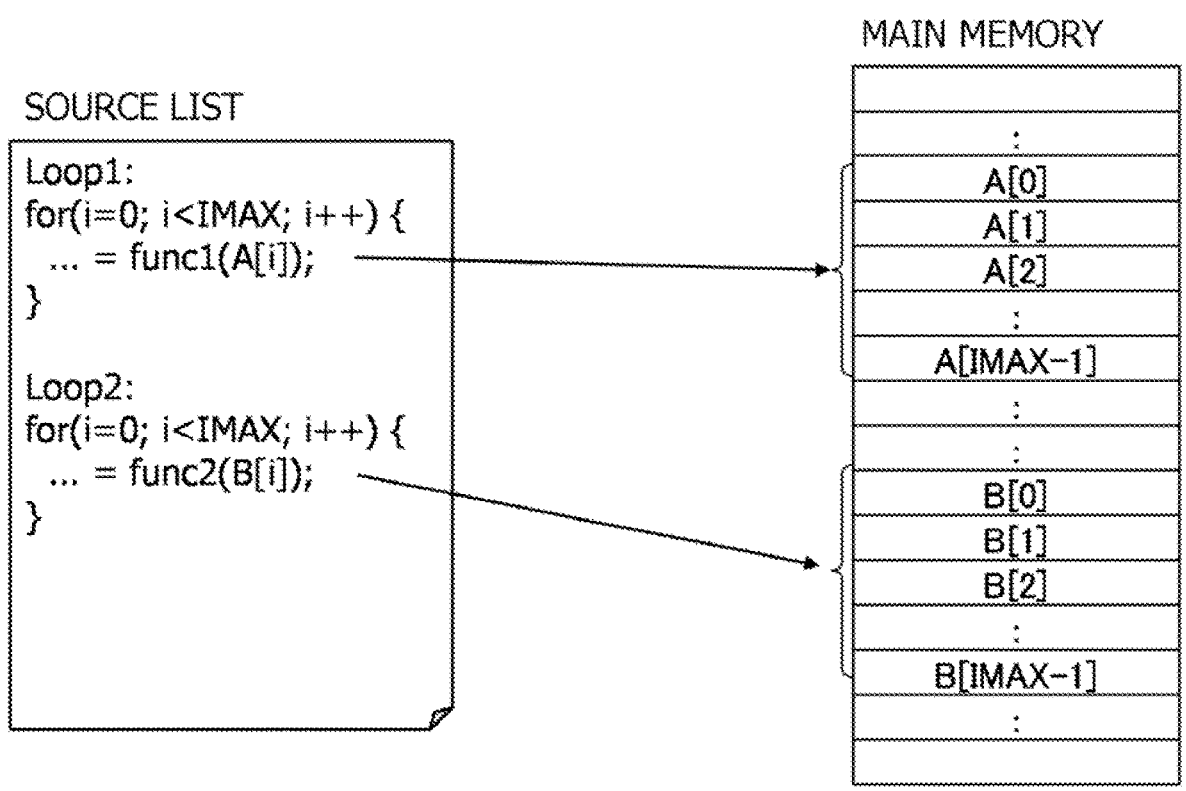
FIG. 3 is an explanatory diagram illustrating an example of a source list of a program to be executed by a processor in FIG. 1.

FIG. 3 illustrates an example of a source list of a program to be executed by the processor 20 in FIG. 1. In the example illustrated in FIG. 3, the processor 20 executes IMAX iterations of arithmetic processing func1(A[i]) in a loop process Loop1, and executes IMAX iterations of arithmetic processing func2(B[i]) in a loop process Loop2.

For example, the data sizes (one unit amounts) of data arrays A[i] and B[i] are equal to each other. Therefore, the numbers of cache lines in the L2 cache 40 used for data of the respective data arrays A and B are the same. A cache line is a unit of data input and output to and from the main memory 60 and has, for example, 256 bytes.

In this embodiment, the data size of each of the data arrays A[i] and B[i] is equal to the data size of one cache line. The loop processes Loop1 and Loop2 execute different types of the arithmetic processing func1 and func2, respectively. For example, a running time for the arithmetic processing func1 (A[i]) is longer than a running time for the arithmetic processing func2(B[i]).

The running time for the arithmetic processing func1(A [i]) is equal to the memory access latency Lm for one unit amount. Therefore, the arithmetic processing func1(A[i]) uses a prefetch distance="1" based on Expression (1). The running time for the arithmetic processing func2(B[i]) is shorter than the memory access latency Lm and is equal to or longer than half of the memory access latency Lm. Therefore, the arithmetic processing func2(B[i]) uses a prefetch distance="2" based on Expression (1).

For example, the prefetch distance PFD indicates a location on the main memory 60 that stores one unit amount of data to be prefetched from the main memory 60 relative to a location on the main memory 60 that stores one unit amount of data transferred from the main memory 60 due to the occurrence of a cache miss.

Figure 4:
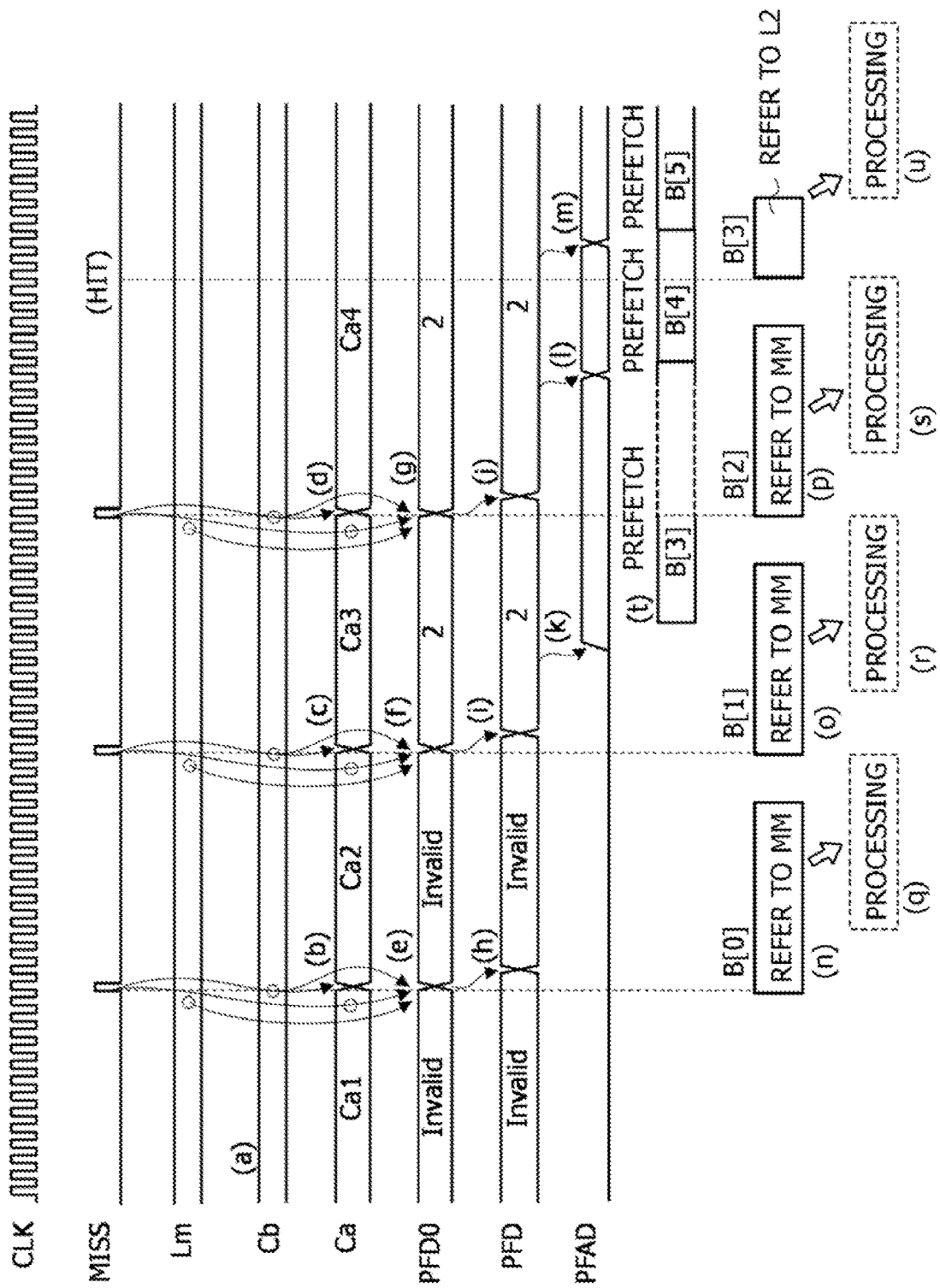
FIG. 4 is a timing chart illustrating an example of an operation of the prefetcher in FIG. 2.

FIG. 4 illustrates an example of an operation of the prefetcher 50 in FIG. 2. FIG. 4 illustrates an example in which the loop process Loop2 is executed using the data array B[i] illustrated in FIG. 3. The clock counter 51 counts clocks and outputs the counter value Cb ((a) in FIG. 4). Although the waveform of a clock CLK in FIG. 4 is illustrated as long cycles for easy understanding, the cycles are actually shorter than that in FIG. 4. The counter value Cb sequentially increments in synchronization with the clock CLK.

Every time a cache miss signal MISS is received, the cycle count holding circuit 52 updates the counter value Ca by holding the counter value Cb as the counter value Ca ((b), (c), and (d) in FIG. 4). Every time a cache miss signal MISS is received, the prefetch distance calculation circuit 54 calculates the prefetch distance PFD0 based on the memory access latency Lm and the counter values Cb and Ca ((e), (f), and (g) in FIG. 4). For example, the prefetch distance calculation circuit 54 calculates the prefetch distance PFD0 by using Expression (1).

The prefetch distance holding circuit 55 holds the prefetch distance PFD0 as the prefetch distance PFD and outputs the prefetch distance PFD to the prefetch address generation circuit 56 ((h), (i), and (j) in FIG. 4). The prefetch address generation circuit 56 determines whether the memory address at the time of a cache miss matches the prefetch candidate predicted and registered at the time of the previous cache miss. When the memory address at the time of the cache miss matches the prefetch candidate, the prefetch address generation circuit 56 generates the prefetch address PFAD based on the prefetch distance PFD ((k), (l), and (m) in FIG. 4).

For example, the prefetch address generation circuit 56 determines the timing of generating the prefetch address PFAD based on a reception interval of cache miss signals MISS. Thus, after a cache hit (HIT) occurs thanks to prefetching of the data array B[3], the prefetch address generation circuit 56 is capable of generating the prefetch address PFAD at appropriate timing even when a cache miss signal MISS is not received.

In a case where a cache miss occurs, the L2 cache 40 refers to the main memory 60 (MM), and reads the data arrays B ((n), (o), and (p) in FIG. 4). The core 30 executes the loop process Loop2 by using the read data arrays B ((q), (r), and (s) in FIG. 4).

For example, after the start of reading of the data array B[1] from the main memory 60, the prefetch address generation circuit 56 generates a prefetch address PFAD for prefetching the data array B[3], which is the second following data array, according to the prefetch distance PFD="2". The L2 cache 40 prefetches the data array B[3] from the main memory 60 by using the prefetch address PFAD at timing at which no contention occurs with the reading of the data array B[2] ((t) in FIG. 4).

Thus, in the loop process Loop2, the core 30 is able to execute the arithmetic processing using the data array B[3] prefetched to the L2 cache 40 after the arithmetic processing on the data array B[2] ((u) in FIG. 4). As described above, the prefetch address generation circuit 56 sequentially generates the prefetch addresses PFAD. Thus, the subsequent loop process Loop2 by the core 30 may be executed by using the data arrays B[4] and B[5] prefetched to the L2 cache 40.

Figure 5:
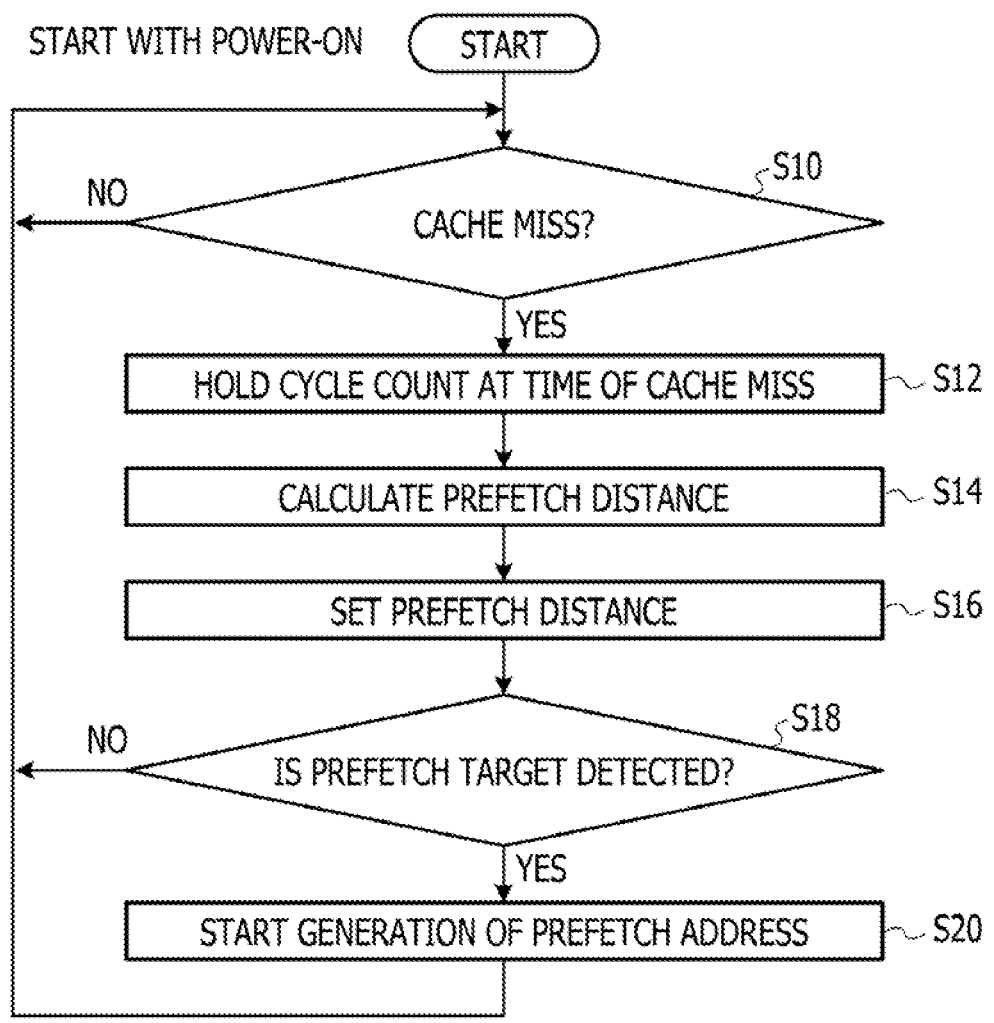
FIG. 5 is a flowchart illustrating an example of an operation of the prefetcher in FIG. 2.

FIG. 5 illustrates an example of an operation of the prefetcher 50 in FIG. 2. The operation flow illustrated in FIG. 5 illustrates an example of a method of controlling a calculator. The operation illustrated in FIG. 5 is started based on power-on of the calculator 10 or the processor 20 and then repeatedly executed.

First, in step S10, the prefetcher 50 waits for reception of a cache miss signal MISS, and executes step S12 when receiving a cache miss signal MISS. In step S12, the prefetcher 50 causes the cycle count holding circuit 52 to hold the cycle count at the time of the cache miss. The prefetcher 50 registers a prefetch candidate when the cache miss occurs.

Next, in step S14, the prefetcher 50 causes the prefetch distance calculation circuit 54 to calculate the prefetch distance PFD0. The prefetch distance PFD0 is calculated when two or more cache misses occur. Next, in step S16, the prefetcher 50 sets the prefetch distance PFD0 calculated in step S14 in the prefetch distance holding circuit 55.

The clock counter 51 operates all the time, and the prefetch distance calculation circuit 54 calculates the prefetch distance PFD0 every time a cache miss signal MISS is received. Thus, for example, when a cache miss occurs in the first arithmetic processing of the loop process Loop1 illustrated in FIG. 3, the prefetch distance PFD0 calculated by the prefetch distance calculation circuit 54 is an invalid value having no meaning. At this time, the prefetch address PFAD held in the prefetch distance holding circuit 55 is also an invalid value having no meaning.

In this embodiment, the prefetcher 50 calculates the prefetch distance PFD0 in accordance with the cache miss intervals. Thus, the prefetch distance PFD is not set by a dedicated command from the outside of the calculator 10. For example, the prefetch distance PFD may be automatically set by the prefetcher 50 without being set from the outside.

Next, the prefetcher 50 executes step S20 if the prefetch address generation circuit 56 detects a prefetch target in step S18, or returns to step S10 if not. For example, when determining that the memory address at the time of the cache miss matches the prefetch candidate predicted and registered at the time of the previous cache miss, the prefetch address generation circuit 56 determines that the prefetch target is detected. The prefetch address generation circuit 56 determines that the prefetch distance PFD0 calculated by the prefetch distance calculation circuit 54 is valid.

Next, in step S20, the prefetch address generation circuit 56 starts generating the prefetch address separated by an appropriate distance based on the prefetch distance PFD. The operation then returns to step S10.

Figure 6:
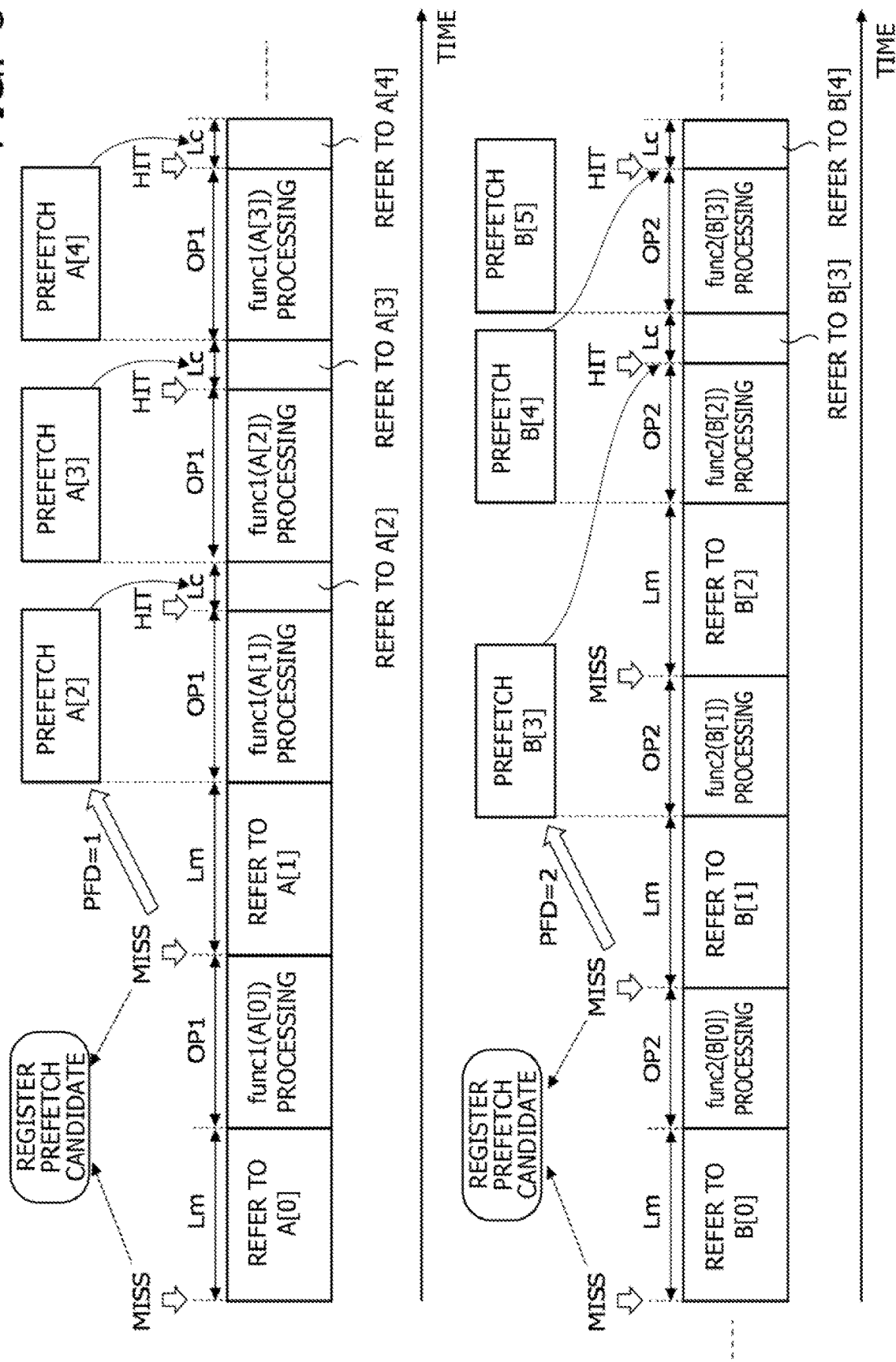
FIG. 6 is an explanatory diagram illustrating an example of an operation of the calculator in FIG. 1.

FIG. 6 illustrates an example of an operation of the calculator 10 in FIG. 1. FIG. 6 illustrates an example in which the loop processes Loop1 and Loop2 are sequentially executed in accordance with the source list of the program illustrated in FIG. 3. In FIG. 6, a sign MISS indicates a cache miss, and a sign HIT indicates a cache hit.

A sign Lm indicates a memory access latency for reading one unit amount of the data array A or the data array B by referring to the main memory 60. The memory access latency Lm is also requested to prefetch one unit amount of the data array A or the data array B from the main memory 60. A sign Lc indicates a latency for reading one unit amount of the data array A or the data array B by referring to the L2 cache 40.

A sign OP1 indicates a cycle count requested for the arithmetic processing on the data array A, and a sign OP2 indicates a cycle count requested for the arithmetic processing on the data array B. As described with reference to FIG. 3, for example, the cycle count OP1 is equal to the memory access latency Lm, and the cycle count OP2 is shorter than the memory access latency Lm and is half or more of the memory access latency Lm. Therefore, according to Expression (1), the loop process Loop1 for executing the arithmetic processing func1(A[i]) uses the prefetch distance="1", while the loop process Loop2 for executing the arithmetic processing func2(B[i]) uses the prefetch distance="2".

In the loop process Loop1 with the prefetch distance of "1", the L2 cache 40 prefetches, for example, the data array A[2], which is the first following data array of the data array A[1] under the arithmetic processing. In the loop process Loop2 with the prefetch distance of "2", the L2 cache 40 prefetches, for example, the data array B[3], which is the second following data array of the data array B[1] under the arithmetic processing. Although not illustrated in FIG. 6, for example, in a case where the prefetch distance is "3", the L2 cache 40 prefetches the third following data array of a data array under the arithmetic processing.

As illustrated in FIG. 6, even in a case where the loop processes Loop1 and Loop2 with the different cycle counts requested for arithmetic processing are executed by a single program, the prefetcher 50 is capable of setting the optimal prefetch distances PFD for the respective loop processes Loop1 and Loop2. The prefetcher 50 is capable of prefetching a data array from the main memory 60 by using the prefetch address PFAD generated in accordance with the set prefetch distance. Even when a program includes three or more loop processes Loop, the prefetcher 50 is capable of setting the optimal prefetch distances PFD for the respective loop processes.

Figure 7:
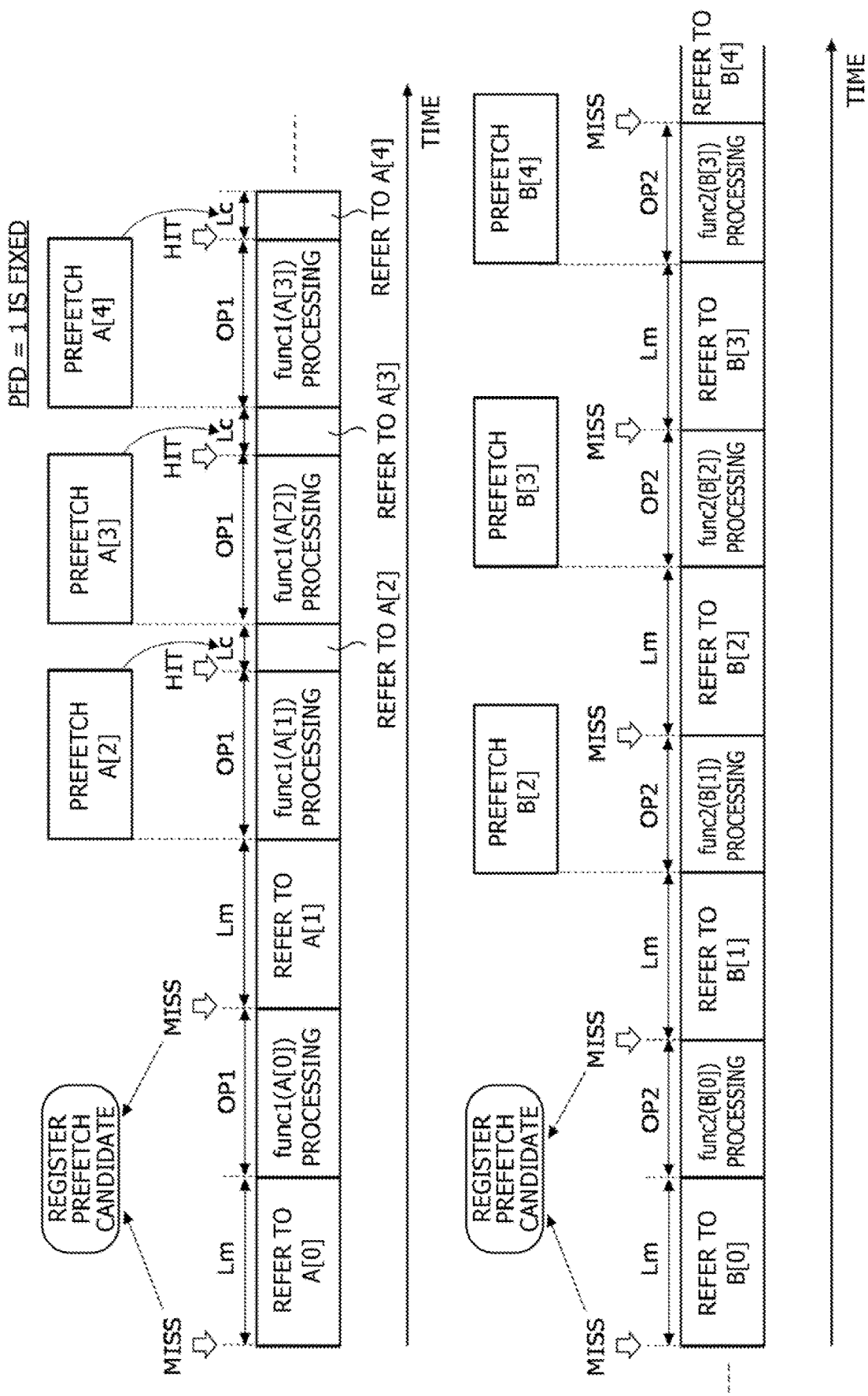
FIG. 7 is an explanatory diagram illustrating an example of an operation of another calculator.

FIG. 7 illustrates an example of an operation of another calculator. The same portions of the operation as those illustrated in FIG. 6 are denoted by the same signs and detailed description thereof will be omitted herein. Also in the example illustrated in FIG. 7, the loop processes Loop1 and Loop2 are sequentially executed in accordance with the source list of the program illustrated in FIG. 3. However, in FIG. 7, before the program is executed, the prefetch distance PFD is set to "1" in advance by a dedicated command from the outside of the calculator 10.

Since the prefetch distance PFD is set to "1", the operation of the loop process Loop1 is the same as that in FIG. 6. In the loop process Loop2, the L2 cache 40 also prefetches, for example, the data array B[2], which is the first following data array of the data array B[1] under the arithmetic processing, as in the loop process Loop1.

The length of time requested to prefetch the data array B from the main memory 60 is the memory access latency Lm. Thus, the prefetching of the data array B[2] is not completed during the execution of the arithmetic processing on the data array B[1] shorter than the memory access latency Lm.

Therefore, when a load instruction for the data array B[2] is executed, a cache miss MISS occurs and the data array B[2] is read from the main memory 60. As a result, the prefetching of the data array B[2] is useless. Similarly, prefetching of the data arrays B[3] and B[4] is not completed during the execution of the arithmetic processing on the data arrays B[2] and B[3], respectively. Therefore, when the load instructions for the data arrays B[3] and B[4] are executed, cache misses MISS occur and the data arrays B[3] and B[4] are read from the main memory 60.

From the above, in a case where the prefetch distance PFD is fixed and the loop processes Loop1 and Loop2 with the different cycle counts requested for arithmetic processing are executed by a single program, it is not possible to set the optimal prefetch distances PFD for the respective loop processes Loop1 and Loop2. This causes many cache misses MISS, and results in decrease in the program execution efficiency and accordingly decrease in the processing performance of the calculator.

As described above, in this embodiment, when a program including a plurality of loop processes Loop1 and Loop2 different in arithmetic processing time is executed, an appropriate prefetch distance may be calculated for each of the loop processes Loop1 or Loop2. In this case, for example, the prefetcher 50 may easily calculate the prefetch distance PFD based on the cache miss occurrence interval and the memory access latency Lm in accordance with Expression (1).

Thus, as compared with the case where a common prefetch distance is set for a program including a plurality of loop processes Loop1 and Loop2, the hit rate of the L2 cache 40 may be improved and the execution efficiency of the program may be improved. As a result, the processing performance of the calculator 10 may be improved. The prefetch distance PFD may be automatically set by the prefetcher 50 without being set from the outside.

The prefetcher 50 uses the clock counter 51 and the cycle count holding circuit 52 to obtain a cache miss occurrence interval as the clock cycle count, and calculates the prefetch distance PFD using the memory access latency Lm expressed by the clock cycle count. Thus, the prefetch distance PFD may be calculated by using the simple prefetch distance calculation circuit 54.

Figure 8:
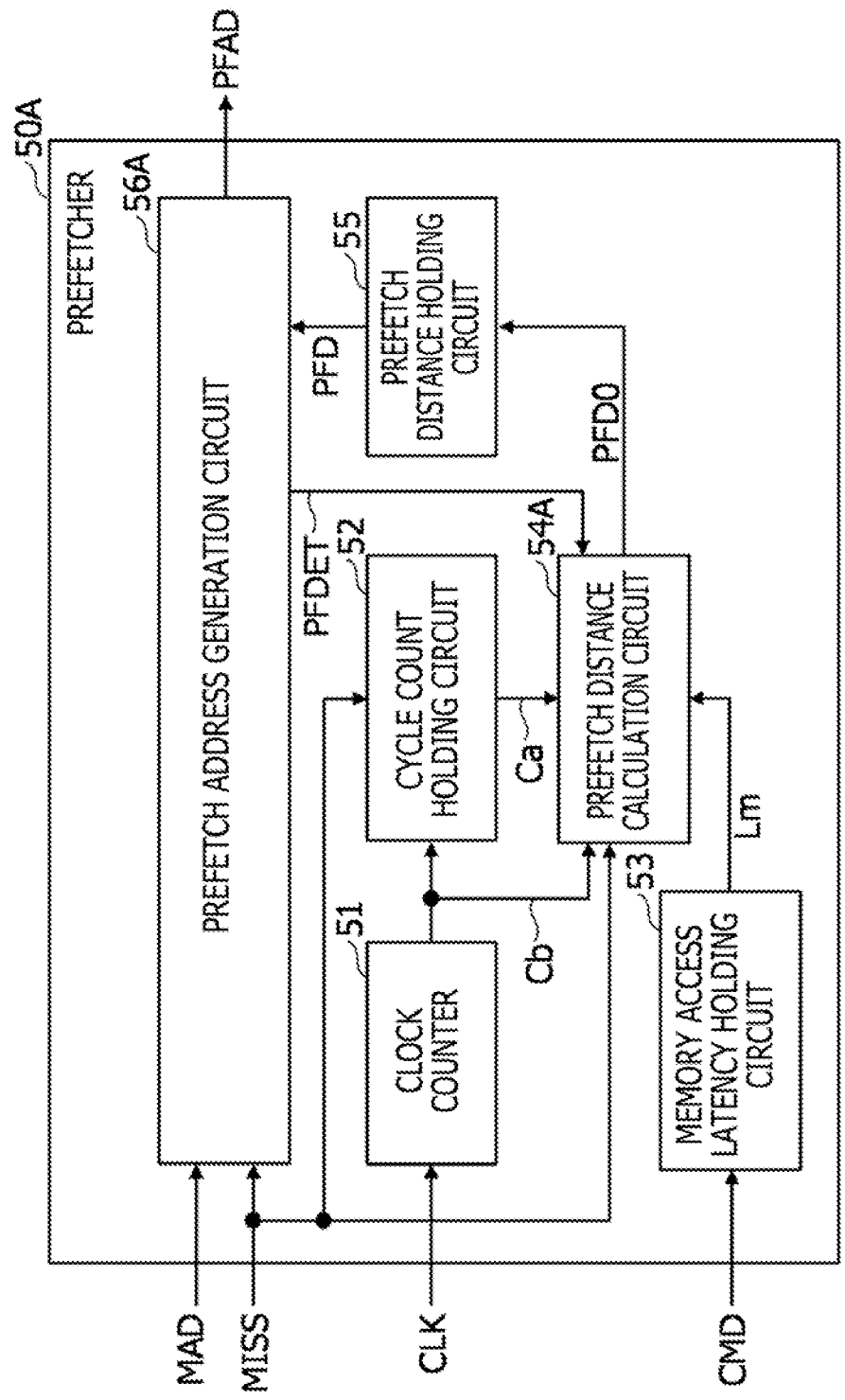
FIG. 8 is a block diagram illustrating an example of a prefetcher installed in a calculator according to another embodiment.

FIG. 8 illustrates an example of a prefetcher installed in a calculator according to another embodiment. The same elements as those illustrated in FIG. 2 are denoted by the same reference signs and detailed description thereof will be omitted herein. A prefetcher 50A illustrated in FIG. 8 is installed in the L2 cache 40 of the calculator 10 illustrated in FIG. 1. The configuration and function of the calculator 10 including the prefetcher 50A are the same as the configuration and function of the calculator 10 in FIG. 1 except that the L2 cache 40 includes the prefetcher 50A instead of the prefetcher 50.

The prefetcher 50A includes a prefetch distance calculation circuit 54A and a prefetch address generation circuit 56A instead of the prefetch distance calculation circuit 54 and the prefetch address generation circuit 56 in FIG. 2. The other configuration of the prefetcher 50A is the same as the configuration of the prefetcher 50 in FIG. 2.

In the same way as in the prefetch address generation circuit 56, the prefetch address generation circuit 56A determines that a prefetch target is detected when determining that a memory address at the time of a cache miss matches a prefetch candidate predicted and registered at the time of the previous cache miss. After that, the prefetch address generation circuit 56A determines that the valid prefetch distance PFD0 is calculable by the prefetch distance calculation circuit 54A, and outputs a prefetch target detection signal PFDET to the prefetch distance calculation circuit 54A. The prefetch target detection signal PFDET is an example of a calculation start signal generated when a cache-missed memory address matches a prefetch candidate predicted at the time of the previous cache miss.

Only when receiving a cache miss signal MISS and a prefetch target detection signal PFDET, the prefetch distance calculation circuit 54A calculates the prefetch distance PFD0 based on the memory access latency Lm and the counter values Cb and Ca. For example, the prefetch distance PFD0 is obtained by using Expression (1).

Thus, the prefetch distance calculation circuit 54A may not wastefully calculate the invalid prefetch distance PFD0, and the prefetch distance holding circuit 55 may be inhibited from holding the invalid prefetch distance PFD. As a result, the prefetcher 50A may be efficiently operated, and the power consumption of the prefetcher 50A may be reduced.

Figure 9:
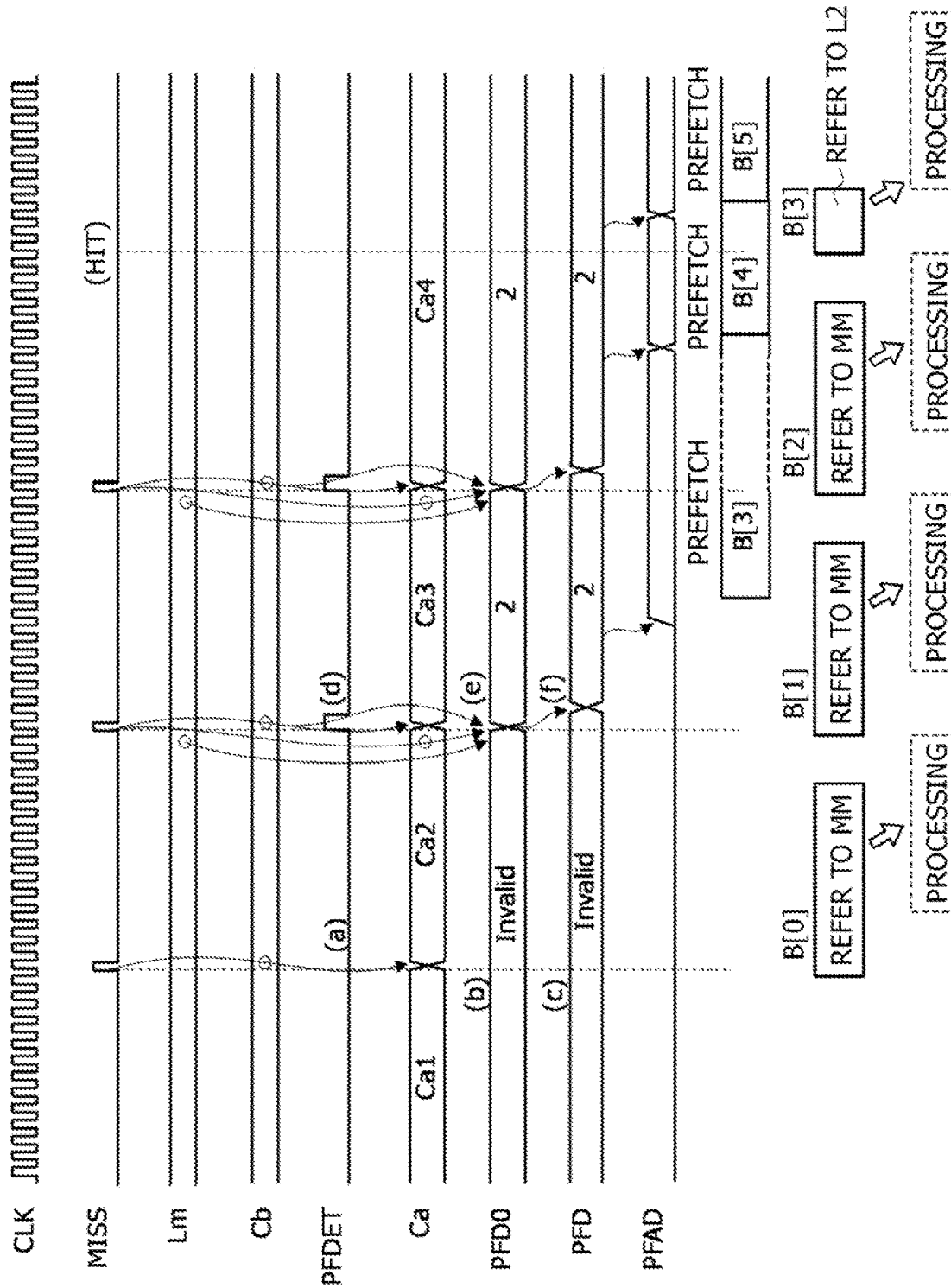
FIG. 9 is a timing chart illustrating an example of an operation of the prefetcher in FIG. 8.

FIG. 9 illustrates an example of an operation of the prefetcher 50A in FIG. 8. Detailed description will be omitted for the same operation as that illustrated in FIG. 4. Also in FIG. 9, the loop processes Loop1 and Loop2 are sequentially executed according to the source list of the program illustrated in FIG. 3.

In FIG. 9, even when receiving a cache miss signal MISS, the prefetch distance calculation circuit 54A does not calculate the prefetch distance PFD0 if a prefetch target detection signal PFDET is not received ((a) and (b) in FIG. 9). Therefore, the prefetch distance holding circuit 55 does not hold the prefetch distance PFD ((c) in FIG. 9).

On the other hand, when receiving the cache miss signal MISS and the prefetch target detection signal PFDET together, the prefetch distance calculation circuit 54A calculates the prefetch distance PFD0 ((d) and (e) in FIG. 9). The prefetch distance holding circuit 55 holds the prefetch distance PFD0 calculated by the prefetch distance calculation circuit 54A as the prefetch distance PFD ((f) in FIG. 9). The subsequent operation is the same as that in FIG. 4.

Figure 10:
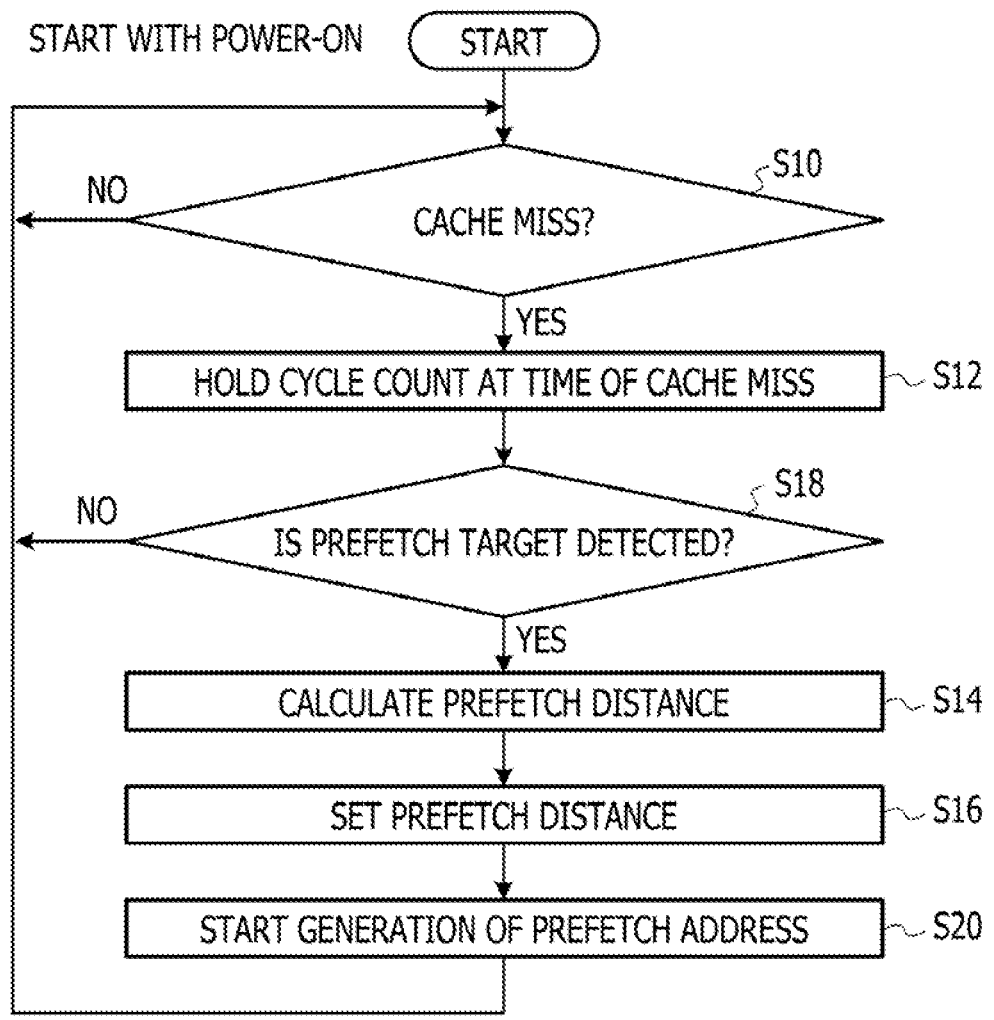
FIG. 10 is a flowchart illustrating an example of an operation of the prefetcher in FIG. 8.

FIG. 10 illustrates an example of an operation of the prefetcher 50A in FIG. 8. The same processing as that in the operation flow illustrated in FIG. 5 will be denoted by the same step numbers as in FIG. 5, and detailed description thereof will be omitted herein. The operation flow illustrated in FIG. 10 is the same as the operation flow illustrated in FIG. 5 except that step S18 in FIG. 5 is moved before step S14.

After step S12, in step S18, the prefetch address generation circuit 56A of the prefetcher 50A determines whether the prefetch candidate registered in advance and the cache-missed memory address match each other (whether a prefetch target is detected). The prefetcher 50A executes step S14 if the prefetch address generation circuit 56A detects the prefetch target or returns to step S10 if not. For example, the prefetcher 50A executes step S14 when determining that the valid prefetch distance PFD0 is calculable by the prefetch distance calculation circuit 54A based on the prefetch candidate registered in advance.

Only when the prefetch candidate and the cache-missed memory address match each other, the prefetch distance calculation circuit 54A calculates the prefetch distance PFD0. The operation of the calculator 10 including the prefetcher 50A is the same as that in FIG. 6.

As described above, this embodiment is also capable of producing the effects similar to or the same as those in the foregoing embodiment. For example, it is possible to calculate an appropriate prefetch distance for each of the loop processes Loop1 and Loop2, and it is possible to improve the hit rate of the L2 cache 40. This results in improvement of the program execution efficiency and accordingly improvement of the processing performance of the calculator 10.

In this embodiment, the prefetch distance calculation circuit 54A may not wastefully calculate the invalid prefetch distance PFD0, and the prefetch distance holding circuit 55 may be inhibited from holding the invalid prefetch distance PFD. As a result, the prefetcher 50A may be efficiently operated, and the power consumption of the prefetcher 50A may be reduced.

Figure 11:
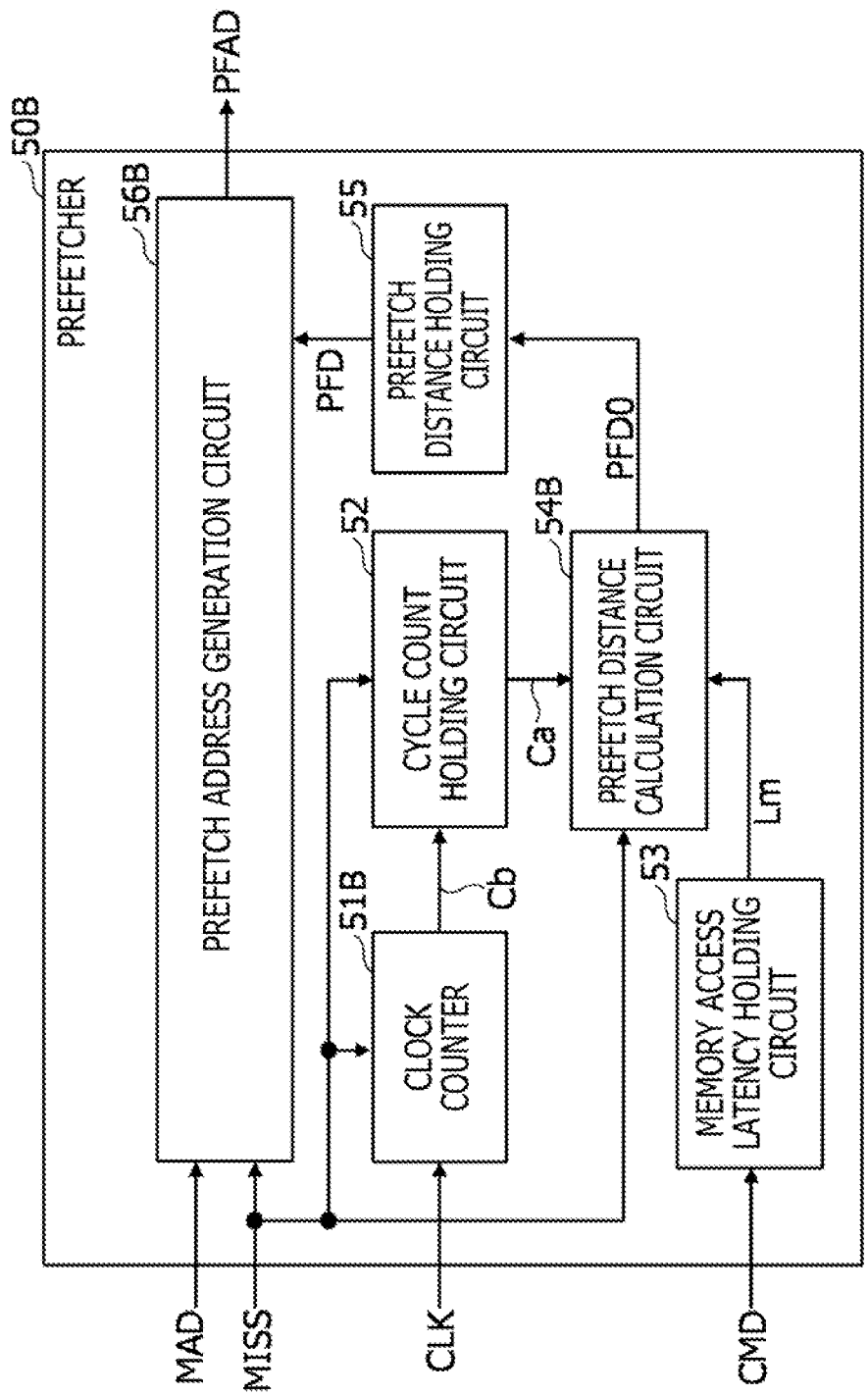
FIG. 11 is a block diagram illustrating an example of a prefetcher installed in a calculator according to another embodiment.

FIG. 11 illustrates an example of a prefetcher installed in a calculator according to another embodiment. The same elements as those illustrated in FIG. 2 are denoted by the same reference signs and detailed description thereof will be omitted herein. A prefetcher 50B illustrated in FIG. 11 is installed in the L2 cache 40 of the calculator 10 illustrated in FIG. 1. The configuration and function of the calculator 10 including the prefetcher 50B are the same as the configuration and function of the calculator 10 in FIG. 1 except that the L2 cache 40 includes the prefetcher 50B instead of the prefetcher 50.

The prefetcher 50B has the same configuration as that of the prefetcher 50 in FIG. 2 except that the prefetcher 50B includes a clock counter 51B and a prefetch distance calculation circuit 54B instead of the clock counter 51 and the prefetch distance calculation circuit 54 in FIG. 2.

The clock counter 51B makes a clock count of a clock CLK until a cache miss signal MISS is received, and outputs the clock count thus obtained as a counter value Cb. The clock counter 51B clears the counter value Cb to, for example, "0" in synchronization with the cache miss signal MISS. For example, the clock counter 51B is cleared every time a cache miss occurs. Therefore, the counter value Cb before being cleared when the cache miss signal MISS is received indicates an interval between cache misses that occur consecutively, and is equivalent to "Cb−Ca" in Expression (1).

In synchronization with the cache miss signal MISS, the cycle count holding circuit 52 holds the counter value Cb indicating a cache miss interval and outputs the counter value Cb as a counter value Ca. For example, the counter value Ca updated every time a cache miss signal MISS is received indicates the cache miss interval.

In response to reception of the cache miss signal MISS, the prefetch distance calculation circuit 54B calculates the prefetch distance PFD0 based on the memory access latency Lm and the counter value Ca, and outputs the calculated prefetch distance PFD0. For example, the prefetch distance calculation circuit 54B calculates the prefetch distance PFD0 by using Expression (2).

$$PFD0=CEIL(Lm/(Ca-Lm)) \quad (2)$$

Since the counter value Ca in this embodiment represents "Cb−Ca" in Expression (1), Expression (2) is substantially the same as Expression (1).

On the other hand, Expression (2) is simpler than Expression (1). Thus, the prefetch distance calculation circuit 54B may have a simpler circuit configuration and more easily calculate the prefetch distance PFD0 than the prefetch distance calculation circuit 54 illustrated in FIG. 2 does. As a result, the circuit size and power consumption of the prefetch distance calculation circuit 54B may be made smaller than the circuit size and power consumption of the prefetch distance calculation circuit 54, respectively.

Figure 12:
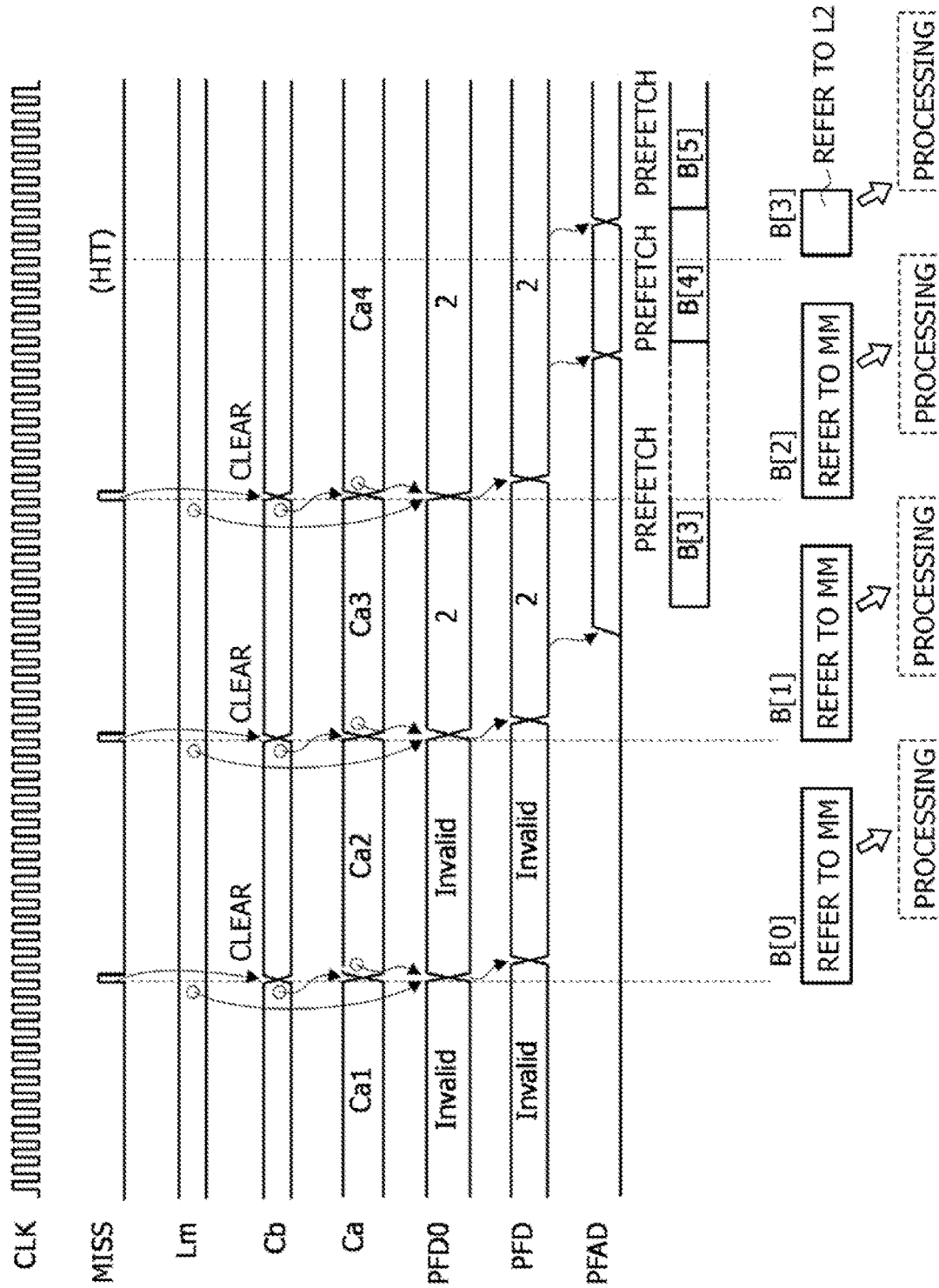
FIG. 12 is a timing chart illustrating an example of an operation of the prefetcher in FIG. 11.

FIG. 12 illustrates an example of an operation of the prefetcher in FIG. 11. Detailed description will be omitted for the same operation as that illustrated in FIG. 4. Also in FIG. 12, the loop processes Loop1 and Loop2 are sequentially executed according to the source list of the program illustrated in FIG. 3.

In FIG. 12, the counter value Cb is cleared every time a cache miss occurs. As in FIG. 4, the counter value Cb sequentially increments in synchronization with the clock CLK.

The cycle count holding circuit 52 holds, as the counter value Ca, the counter value Cb before being cleared in synchronization with a cache miss signal MISS. When a cache miss occurs, the prefetch distance calculation circuit 54B uses the memory access latency Lm and the counter value Ca to calculate the prefetch distance PFD0 based on Expression (2). The operation illustrated in FIG. 12 is the same as the operation illustrated in FIG. 4 except that the counter value Cb is cleared and the prefetch distance PFD0 is calculated by the prefetch distance calculation circuit 54B in a different method.

FIG. 13 illustrates an example of an operation of the prefetcher in FIG. 11. The same processing as that in the operation flow illustrated in FIG. 5 will be denoted by the same step numbers as in FIG. 5, and detailed description thereof will be omitted herein. The operation flow illustrated in FIG. 13 is the same as the operation flow illustrated in FIG. 5 except that step S13 is inserted between steps S12 and S14.

In step S14, the prefetch distance calculation circuit 54B calculates the prefetch distance PFD0 by using Expression (2). In step S13, the prefetcher 50B clears the counter value Cb of the clock counter 51B. The operation of the calculator 10 including the prefetcher 50B is the same as that in FIG. 6.

As described above, this embodiment is also capable of producing the effects similar to or the same as those in the foregoing embodiments. For example, it is possible to calculate an appropriate prefetch distance for each of the loop processes Loop1 and Loop2, and it is possible to improve the hit rate of the L2 cache 40. This results in improvement of the program execution efficiency and accordingly improvement of the processing performance of the calculator 10.

In this embodiment, the prefetch distance calculation circuit 54B may have a simpler circuit configuration and more easily calculate the prefetch distance PFD0 than the prefetch distance calculation circuit 54 illustrated in FIG. 2 does. As a result, the circuit size and power consumption of the prefetch distance calculation circuit 54B may be made smaller than the circuit size and power consumption of the prefetch distance calculation circuit 54, respectively.

The above embodiments have been described for the example in which the prefetcher 50 (or 50A or 50B) is installed in the L2 cache 40. However, the prefetcher 50 may be installed in each of the L1 caches 34 in FIG. 1, or may be installed in each of the L1 caches 34 and the L2 cache 40. For example, when the prefetchers 50 are installed in both of the L1 caches 34 and the L2 cache 40, the hit rates may be improved in both of the L1 caches 34 and the L2 cache 40. As a result, the processing performance of the calculator 10 may be further improved.

Instead of the clock counter 51, the prefetcher 50A illustrated in FIG. 8 may include a clock counter 51B (FIG. 11) whose counter value Cb is cleared every time a cache miss occurs. Only when receiving a cache miss signal MISS and a prefetch target detection signal PFDET, the prefetch distance calculation circuit 54A may calculate the prefetch distance PFD0 based on the memory access latency Lm and the counter value Ca. In this case, the prefetch distance PFD0 is calculated by using Expression (2).

The features and advantages of the embodiments are apparent from the above detailed description. The scope of claims is intended to cover the features and advantages of the embodiments described above within a scope not departing from the spirit and scope of right of the claims. Any person having ordinary skill in the art may easily conceive every improvement and alteration. Accordingly, the scope of inventive embodiments is not intended to be limited to that described above and may rely on appropriate modifications and equivalents included in the scope disclosed in the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A calculator comprising:
a processing core that executes arithmetic processing; and
a cache including a data memory that holds data transferred from a main memory and a cache controller that controls transfer of data between the main memory and the data memory, wherein
the cache controller is configured to
calculate, upon occurrence of a cache miss, a cycle count requested for arithmetic processing on one unit amount of data based on a cache miss occurrence interval and a memory access latency requested to transfer the one unit amount of data from the main memory to the data memory unit, and
update a prefetch distance based on the calculated cycle count and the memory access latency, the prefetch distance indicating a relative distance on the main memory between a location from which the one unit amount of data transferred from the main memory due to the cache miss and a location from which a next one unit amount of data is to be prefetched.

2. The calculator according to claim 1, wherein the cache controller sets, as the prefetch distance, a smallest integer equal to or larger than a value obtained by dividing the memory access latency by the cycle count.

3. The calculator according to claim 1, wherein the cache controller includes
a clock counter that makes a clock count of a clock used in the cache controller,
a cycle count holding circuit that holds the clock count of the clock counter at a time when a cache miss occurs,
a prefetch distance calculation circuit that calculates the prefetch distance based on the memory access latency and a difference between the clock count of the clock counter and the clock count held by the cycle count holding circuit when a cache miss occurs, and
a prefetch address generation circuit that generates, based on the prefetch distance calculated by the prefetch distance calculation circuit, a prefetch address that is a memory address at which data to be prefetched is stored.

4. The calculator according to claim 3, wherein the clock counter is cleared every time a cache miss occurs, and
the prefetch distance calculation circuit calculates the prefetch distance based on the memory access latency and the clock count held in the cycle count holding circuit without using the clock count of the clock counter.

5. The calculator according to claim 1, wherein the cache controller includes
a clock counter that makes a clock count of a clock used in the cache controller,
a cycle count holding circuit that holds the clock count of the clock counter at a time when a cache miss occurs,
a prefetch distance calculation circuit that calculates, based on reception of a calculation start signal, the prefetch distance based on the memory access latency and a difference between the clock count of the clock counter and the clock count held by the cycle count holding circuit, and
a prefetch address generation circuit that, when a cache-missed memory address matches a prefetch candidate predicted at the time of a previous cache miss, generates the calculation start signal and generates a prefetch address that is a memory address at which data to be prefetched is stored based on the prefetch distance calculated by the prefetch distance calculation circuit.

6. The calculator according to claim 1, wherein the processing core sequentially executes a plurality of loop processes which are different in arithmetic processing time and are the same in the one unit amount of data to be used in the arithmetic processing.

7. The calculator according to claim 1, wherein the cache includes multi-level caches, and
the cache controller is included in at least any of the multi-level caches.

8. A calculation method in a computer having a processing core that executes arithmetic processing, and a cache including a data memory that holds data transferred from a main memory and a cache controller that controls transfer of data between the main memory and the data memory, the method comprising:
calculating, upon occurrence of a cache miss, a cycle count requested for arithmetic processing on one unit amount of data based on a cache miss occurrence interval and a memory access latency requested to transfer the one unit amount of data from the main memory to the data memory unit, and
updating a prefetch distance based on the calculated cycle count and the memory access latency, the prefetch distance indicating a relative distance on the main memory between a location from which the one unit amount of data transferred from the main memory due to the cache miss and a location from which a next one unit amount of data is to be prefetched.

9. A non-transitory computer-readable storage medium comprising:
a storage storing computer-readable instructions; and
a processor, coupled to the storage, that executes the instructions to perform a process comprising:
calculating, upon occurrence of a cache miss, a cycle count requested for arithmetic processing on one unit amount of data based on a cache miss occurrence interval and a memory access latency requested to transfer the one unit amount of data from a main memory to a data memory unit, and
updating a prefetch distance based on the calculated cycle count and the memory access latency, the prefetch distance indicating a relative distance on the main memory between a location from which the one unit amount of data transferred from the main memory due to the cache miss and a location from which a next one unit amount of data is to be prefetched.

* * * * *